United States Patent
Lee et al.

(10) Patent No.: US 11,243,781 B2
(45) Date of Patent: Feb. 8, 2022

(54) PROVISIONING SERVICES (PVS) CLOUD STREAMING WITH READ CACHE FILE STORING PREBOOT DATA INCLUDING A NETWORK DRIVER

(71) Applicant: CITRIX SYSTEMS, INC., Fort Lauderdale, FL (US)

(72) Inventors: Moso Lee, Nashua, NH (US); Simon Graham, Bolton, MA (US)

(73) Assignee: CITRIX SYSTEMS, INC., Fort Lauderdale, FL (US)

(*) Notice: Subject to any disclaimer, the term of this patent is extended or adjusted under 35 U.S.C. 154(b) by 30 days.

(21) Appl. No.: 16/808,549

(22) Filed: Mar. 4, 2020

(65) Prior Publication Data
US 2021/0279072 A1    Sep. 9, 2021

(51) Int. Cl.
| G06F 9/4401 | (2018.01) |
| G06F 8/61 | (2018.01) |
| H04L 12/26 | (2006.01) |
| H04L 29/08 | (2006.01) |

(52) U.S. Cl.
CPC .......... *G06F 9/4416* (2013.01); *G06F 8/63* (2013.01); *G06F 9/4406* (2013.01); *G06F 9/4411* (2013.01); *H04L 43/14* (2013.01); *H04L 67/2842* (2013.01); *H04L 67/34* (2013.01)

(58) Field of Classification Search
CPC .................................................. G06F 9/4416
USPC ............................................................ 713/2
See application file for complete search history.

(56) References Cited

U.S. PATENT DOCUMENTS

| 5,452,454 A | * | 9/1995 | Basu ................... G06F 9/4416 713/2 |
| 6,317,826 B1 | * | 11/2001 | McCall ................ G06F 9/4416 713/1 |
| 6,334,149 B1 | * | 12/2001 | Davis, Jr. ............. G06F 9/4416 709/219 |
| 6,463,530 B1 | * | 10/2002 | Sposato ............... G06F 9/4416 709/220 |
| 10,185,575 B2 | * | 1/2019 | Lee ....................... G06F 9/4406 |
| 2010/0299512 A1 | * | 11/2010 | Maruyama ........... G06F 9/4416 713/2 |
| 2011/0320799 A1 | * | 12/2011 | Lam ................... H04L 29/08981 713/2 |
| 2014/0372744 A1 |   | 12/2014 | Xu et al. |
| 2017/0337070 A1 | * | 11/2017 | Lee ....................... G06F 9/4406 |
| 2017/0339223 A1 | * | 11/2017 | Lee ..................... G06F 9/45558 |

* cited by examiner

*Primary Examiner* — Suresh Suryawanshi
(74) *Attorney, Agent, or Firm* — Allen, Dyer, Doppelt + Gilchrist, PA

(57) ABSTRACT

A computing system includes a server to stream a base disk image over a communications network, and a client machine. The client machine includes a read cache to store preboot data including a network driver, and a processor coupled to the read cache. The processor initiates prebooting of the client machine using the preboot data, and after the network driver is running, receives the streamed base disk image from the server via the communications network to continue booting the client machine.

20 Claims, 9 Drawing Sheets

PROVISIONING SERVICES (PVS) CLOUD STREAMING WITH READ CACHE FILE STORING PREBOOT DATA INCLUDING A NETWORK DRIVER

TECHNICAL FIELD

The present disclosure relates to desktop virtualization, and more particularly, to provisioning a client machine.

BACKGROUND

Many organizations are now using desktop virtualization to provide a more flexible option to address the varying needs of their users. In desktop virtualization, a user's computing environment may be separated from the user's physical computing device.

In an environment for centralized management of desktops, multiple client machines may receive access to or execute a computing environment based on copies of a single "golden master" desktop disk image. This golden image is a shared template for virtual machines, and includes an operating system and applications. The golden image may also be referred to as a base disk image.

One approach for machine deployment of the base disk image is based on image cloning. Image cloning may utilize an xcopy operation to copy the base disk image to a virtual disk in each client machine. Once the base disk image is deployed to each client machine, it is a distributed computing model. The approach allows the client machine to perform offline computing after image deployment.

Another approach for machine deployment of the base disk image is based on provisioning services (PVS). Provisioning services utilizes network boot technology to stream the base disk image on demand over a communications network to the client machine. This approach requires that the client machine maintain a constant network connection.

SUMMARY

A computing system includes a server configured to stream a base disk image over a communications network, and a client machine. The client machine includes a read cache configured to store preboot data including a network driver, and a processor coupled to the read cache. The processor is configured to initiate prebooting of the client machine using the preboot data, and after the network driver is running, receive the streamed base disk image from the server via the communications network to continue booting the client machine.

The base disk image may include an operating system, and the preboot data may further include a subset of the operating system including the network driver.

The operating system in the base disk image may include an operating system network driver, and the network driver is configured to be the same as the operating system network driver. The processor may be further configured to switch from using the preboot data in the read cache to using data in the streamed base disk image in response to the network driver running.

The processor may be further configured to execute instructions at preboot to access the read cache for the preboot data. More particularly, the client machine may further include firmware to provide the instructions to be executed at preboot. The firmware may be UEFI (Unified Extensible Firmware Interface) firmware, for example.

The preboot data may include an operating system kernel that includes the network driver, and as the operating system kernel starts to run, the network driver connects to the communications network.

Another aspect is directed to a client machine that includes a read cache configured to store preboot data including a network driver, and a processor coupled to the read cache. The processor is configured to initiate prebooting of the client machine using the preboot data, and after the network driver is running, receive a streamed base disk image from a server via a communications network to continue booting the client machine.

Yet another aspect is directed to a method for operating the client machine as described above. The method includes storing preboot data including a network driver in a read cache within the client machine. The method further includes initiating prebooting of the client machine using the preboot data, and after the network driver is running, receiving a streamed base disk image from a server via a communications network to continue booting the client machine.

DETAILED DESCRIPTION OF THE EMBODIMENTS

The present description is made with reference to the accompanying drawings, in which exemplary embodiments are shown. However, many different embodiments may be used, and thus the description should not be construed as limited to the particular embodiments set forth herein. Rather, these embodiments are provided so that this disclosure will be thorough and complete. Like numbers refer to like elements throughout, and prime notation is used to indicate similar elements in different embodiments.

In desktop virtualization, cloud service providers provide client machines that operate based on copies of a shared "golden master" desktop disk image. As noted above, this golden image may also be referred to as a base disk image, and includes an operating system and applications. There are two different approaches to provide the base disk image to client machines, which may also be referred to as virtual machines.

Some cloud service providers stream the base disk image from a provisioning server to each client machine, such as Citrix Provisioning Services (PVS) by Citrix Systems, Inc., for example. This is possible based on firmware within each client machine providing a network driver during preboot. The network driver allows the client machine to boot from the operating system within the base disk image that is being streamed to the client machine. An advantage of streaming the base disk image is that patches, updates and other configuration changes are made once to the base disk image. Then, when each client machine boots up, it does so with the updated base disk image.

Other cloud service providers copy the base disk image to a virtual disk within each client machine, such as Azure Cloud from Microsoft Corp. and Google Cloud Platform from Google Inc. These client machines do not have a network driver in their firmware since they boot directly from the operating system within the base disk image that is copied to their respective virtual disks. A disadvantage of image cloning is that when a change is made to the base disk image, then each client machine needs to receive a copy of the updated base image before booting up again. The number of times the base disk image is to be copied depends on the number of client machines being supported by the cloud service providers, which may involve hundreds or thousands of client machines, for example.

The techniques and teachings of the present disclosure provide the ability for cloud service providers that are not able to stream a base disk image to client machines to be able to do so since firmware within the client machines lack a network driver. As will be explained in detail below, this is accomplished with a client machine having a read cache that provides the network driver to be used during preboot.

Figure 1:
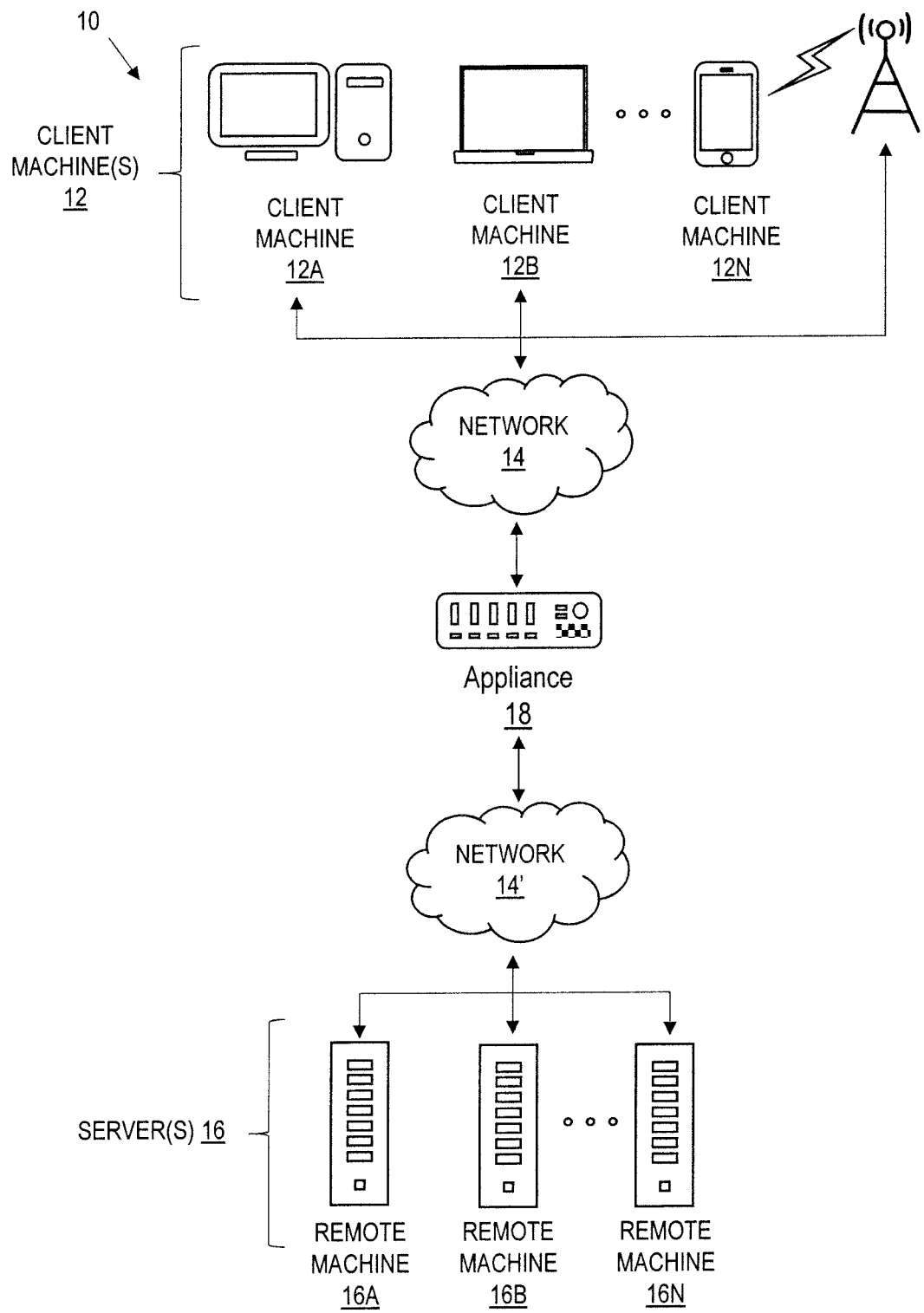
FIG. 1 is a schematic block diagram of a network environment of computing devices in which various aspects of the disclosure may be implemented.

Referring initially to FIG. 1, a non-limiting network environment 10 in which various aspects of the disclosure may be implemented includes one or more client machines 12A-12N, one or more remote machines 16A-16N, one or more networks 14, 14', and one or more appliances 18 installed within the computing environment 10. The client machines 12A-12N communicate with the remote machines 16A-16N via the networks 14, 14'.

In some embodiments, the client machines 12A-12N communicate with the remote machines 16A-16N via an intermediary appliance 18. The illustrated appliance 18 is positioned between the networks 14, 14' and may also be referred to as a network interface or gateway. In some embodiments, the appliance 108 may operate as an application delivery controller (ADC) to provide clients with access to business applications and other data deployed in a data center, the cloud, or delivered as Software as a Service (SaaS) across a range of client devices, and/or provide other functionality such as load balancing, etc. In some embodiments, multiple appliances 18 may be used, and the appliance(s) 18 may be deployed as part of the network 14 and/or 14'.

The client machines 12A-12N may be generally referred to as client machines 12, local machines 12, clients 12, client nodes 12, client computers 12, client devices 12, computing devices 12, endpoints 12, or endpoint nodes 12. The remote machines 16A-16N may be generally referred to as servers 16 or a server farm 16. In some embodiments, a client device 12 may have the capacity to function as both a client node seeking access to resources provided by a server 16 and as a server 16 providing access to hosted resources for other client devices 12A-12N. The networks 14, 14' may be generally referred to as a network 14. The networks 14 may be configured in any combination of wired and wireless networks.

A server 16 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 16 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 16 may execute a remote presentation services program or other program that uses a thin-client or a remote-display protocol to capture display output generated by an application executing on a server 16 and transmit the application display output to a client device 12.

In yet other embodiments, a server 16 may execute a virtual machine providing, to a user of a client device 12, access to a computing environment. The client device 12 may be a virtual machine. The virtual machine may be managed by, for example, a hypervisor, a virtual machine manager (VMM), or any other hardware virtualization technique within the server 16.

In some embodiments, the network 14 may be: a local-area network (LAN); a metropolitan area network (MAN); a wide area network (WAN); a primary public network 14; and a primary private network 14. Additional embodiments may include a network 14 of mobile telephone networks that use various protocols to communicate among mobile devices. For short range communications within a wireless local-area network (WLAN), the protocols may include 802.11, Bluetooth, and Near Field Communication (NFC).

Figure 2:
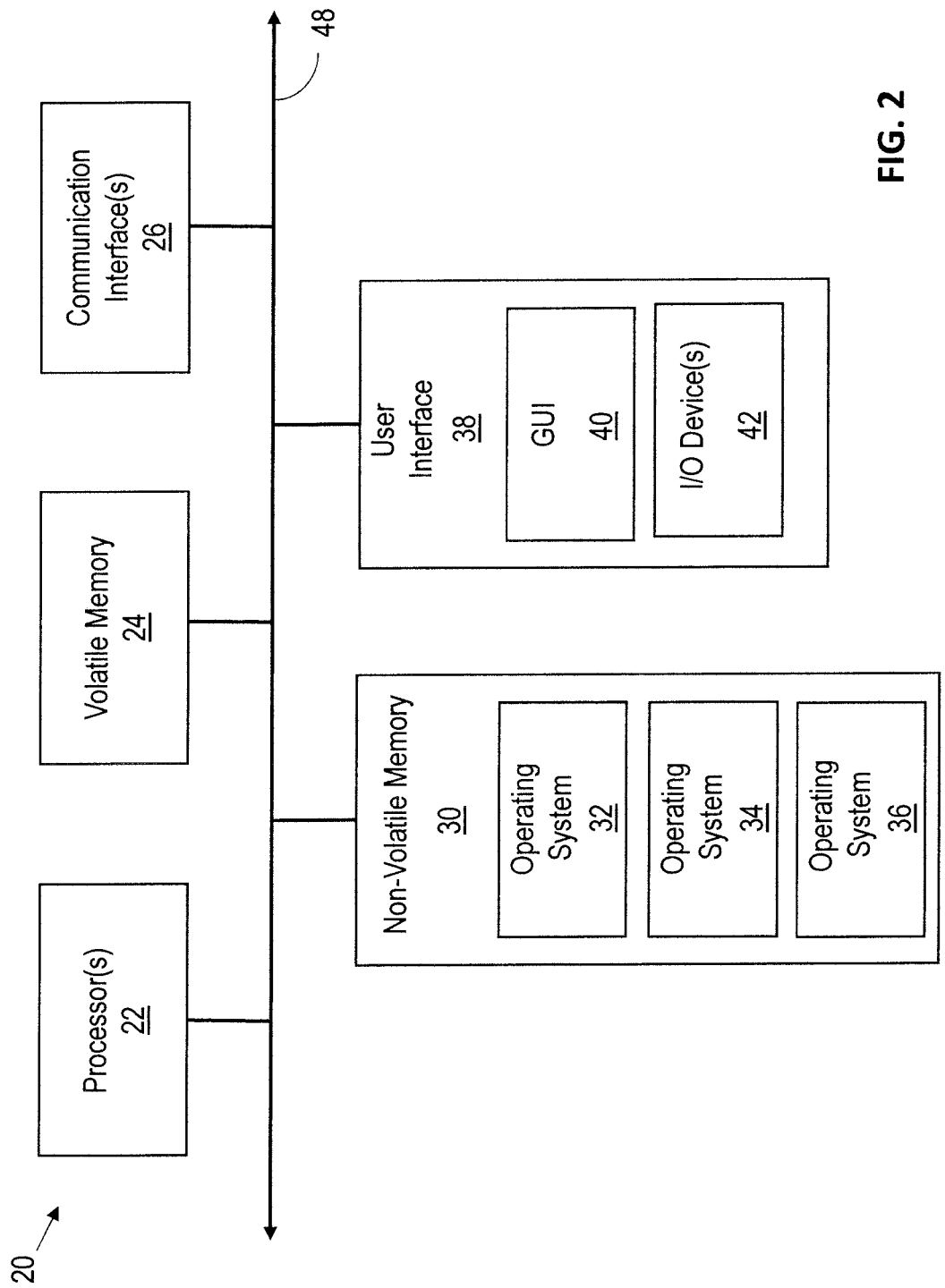
FIG. 2 is a schematic block diagram of a computing device useful for practicing an embodiment of the client machines or the remote machines illustrated in FIG. 1.

FIG. 2 depicts a block diagram of a computing device 20 useful for practicing an embodiment of client devices 12, appliances 18 and/or servers 16. The computing device 20 includes one or more processors 22, volatile memory 24 (e.g., random access memory (RAM)), non-volatile memory 30, user interface (UI) 38, one or more communications interfaces 26, and a communications bus 48.

The non-volatile memory 30 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

The user interface 38 may include a graphical user interface (GUI) 40 (e.g., a touchscreen, a display, etc.) and one or more input/output (I/O) devices 42 (e.g., a mouse, a keyboard, a microphone, one or more speakers, one or more cameras, one or more biometric scanners, one or more environmental sensors, and one or more accelerometers, etc.).

The non-volatile memory 30 stores an operating system 32, one or more applications 34, and data 36 such that, for example, computer instructions of the operating system 32 and/or the applications 34 are executed by processor(s) 22 out of the volatile memory 24. In some embodiments, the volatile memory 24 may include one or more types of RAM and/or a cache memory that may offer a faster response time than a main memory. Data may be entered using an input device of the GUI 40 or received from the I/O device(s) 42. Various elements of the computer 20 may communicate via the communications bus 48.

The illustrated computing device 20 is shown merely as an example client device or server, and may be implemented by any computing or processing environment with any type of machine or set of machines that may have suitable hardware and/or software capable of operating as described herein.

The processor(s) 22 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

The processor 22 may be analog, digital or mixed-signal. In some embodiments, the processor 22 may be one or more physical processors, or one or more virtual (e.g., remotely located or cloud) processors. A processor including multiple processor cores and/or multiple processors may provide functionality for parallel, simultaneous execution of instructions or for parallel, simultaneous execution of one instruction on more than one piece of data.

The communications interfaces 26 may include one or more interfaces to enable the computing device 20 to access a computer network such as a Local Area Network (LAN), a Wide Area Network (WAN), a Personal Area Network (PAN), or the Internet through a variety of wired and/or wireless connections, including cellular connections.

In described embodiments, the computing device 20 may execute an application on behalf of a user of a client device. For example, the computing device 20 may execute one or more virtual machines managed by a hypervisor. Each virtual machine may provide an execution session within which applications execute on behalf of a user or a client device, such as a hosted desktop session. The computing device 20 may also execute a terminal services session to provide a hosted desktop environment. The computing device 20 may provide access to a remote computing environment including one or more applications, one or more desktop applications, and one or more desktop sessions in which one or more applications may execute.

An example virtualization server 16 may be implemented using Citrix Hypervisor provided by Citrix Systems, Inc., of Fort Lauderdale, Fla. ("Citrix Systems"). Virtual app and desktop sessions may further be provided by Citrix Virtual Apps and Desktops (CVAD), also from Citrix Systems. Citrix Virtual Apps and Desktops is an application virtualization solution that enhances productivity with universal access to virtual sessions including virtual app, desktop, and data sessions from any device, plus the option to implement a scalable VDI solution. Virtual sessions may further include Software as a Service (SaaS) and Desktop as a Service (DaaS) sessions, for example.

Figure 3:
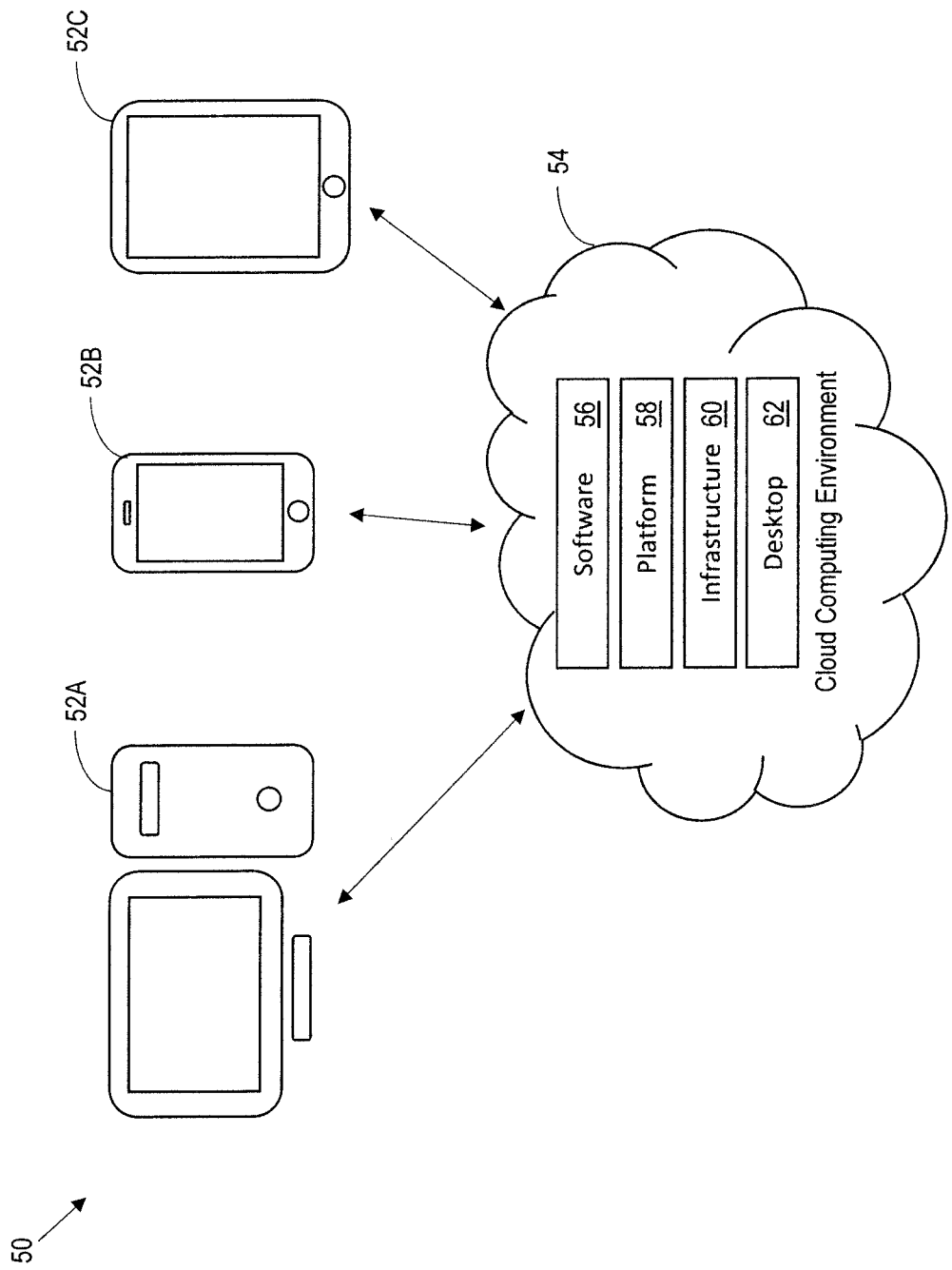
FIG. 3 is a schematic block diagram of a cloud computing environment in which various aspects of the disclosure may be implemented.

Referring to FIG. 3, a cloud computing environment 50 is depicted, which may also be referred to as a cloud environment, cloud computing or cloud network. The cloud computing environment 50 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In the cloud computing environment 50, one or more clients 52A-52C (such as those described above) are in communication with a cloud network 54. The cloud network 54 may include backend platforms, e.g., servers, storage, server farms or data centers. The users or clients 52A-52C can correspond to a single organization/tenant or multiple organizations/tenants. More particularly, in one example implementation the cloud computing environment 50 may provide a private cloud serving a single organization (e.g., enterprise cloud). In another example, the cloud computing environment 50 may provide a community or public cloud serving multiple organizations/tenants. In still further embodiments, the cloud computing environment 50 may provide a hybrid cloud that is a combination of a public cloud and a private cloud. Public clouds may include public servers that are maintained by third parties to the clients 52A-52C or the enterprise/tenant. The servers may be located off-site in remote geographical locations or otherwise.

The cloud computing environment 50 can provide resource pooling to serve multiple users via clients 52A-52C through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, the cloud computing environment 50 can provide on-demand self-service to unilaterally provision computing capabilities (e.g., server time, network storage) across a network for multiple clients 52A-52C. The cloud computing environment 50 can provide an elasticity to dynamically scale out or scale in responsive to different demands from one or more clients 52. In some embodiments, the computing environment 50 can include or provide monitoring services to monitor, control and/or generate reports corresponding to the provided shared services and resources.

In some embodiments, the cloud computing environment 50 may provide cloud-based delivery of different types of cloud computing services, such as Software as a service (SaaS) 56, Platform as a Service (PaaS) 58, Infrastructure as a Service (IaaS) 60, and Desktop as a Service (DaaS) 62, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif.

PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. DROPBOX provided by Dropbox, Inc. of San Francisco, Calif., Microsoft ONEDRIVE provided by Microsoft Corporation, Google Drive provided by Google Inc., or Apple ICLOUD provided by Apple Inc. of Cupertino, Calif.

Similar to SaaS, DaaS (which is also known as hosted desktop services) is a form of virtual desktop infrastructure (VDI) in which virtual desktop sessions are typically delivered as a cloud service along with the apps used on the virtual desktop. Citrix Cloud is one example of a DaaS delivery platform. DaaS delivery platforms may be hosted on a public cloud computing infrastructure such as AZURE CLOUD from Microsoft Corporation of Redmond, Wash. (herein "Azure"), or AMAZON WEB SERVICES provided by Amazon.com, Inc., of Seattle, Wash. (herein "AWS"), for example. In the case of Citrix Cloud, Citrix Workspace app may be used as a single-entry point for bringing apps, files and desktops together (whether on-premises or in the cloud) to deliver a unified experience.

Figure 4:
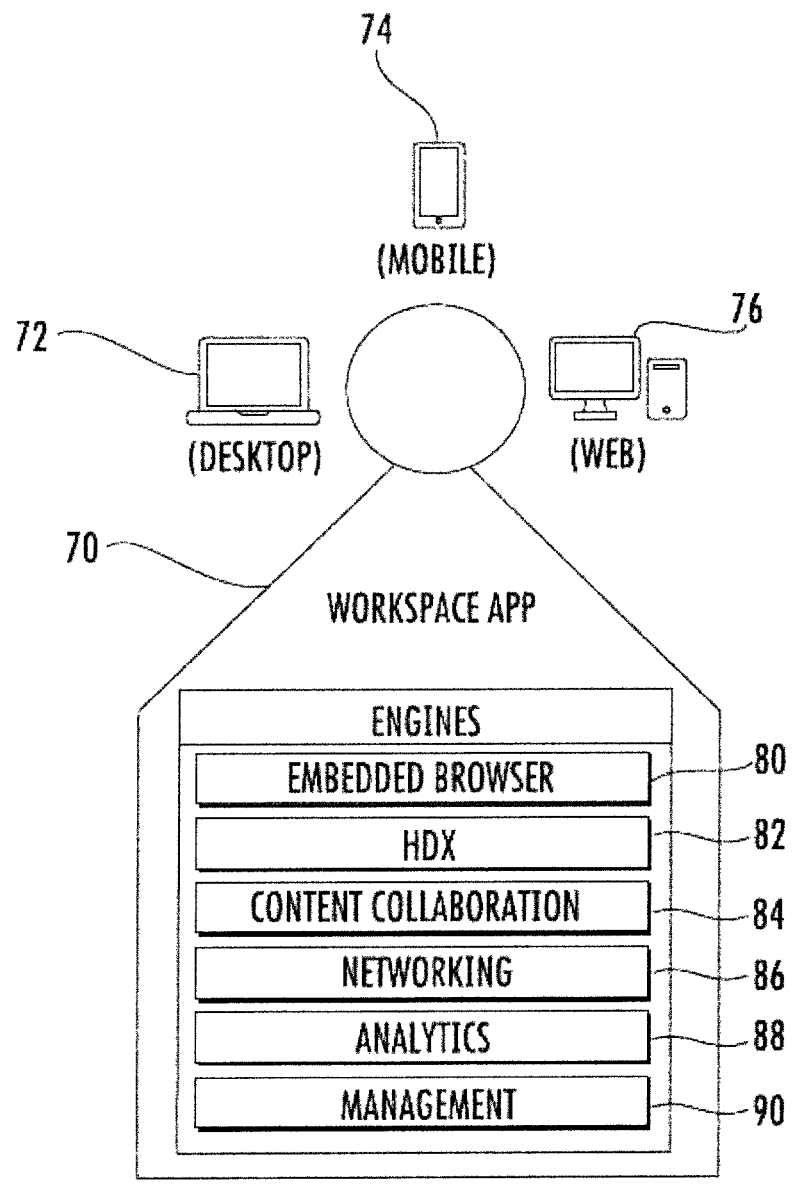
FIG. 4 is a schematic block diagram of desktop, mobile and web based devices operating a workspace app in which various aspects of the disclosure may be implemented.

The unified experience provided by the Citrix Workspace app will now be discussed in greater detail with reference to FIG. 4. The Citrix Workspace app will be generally referred to herein as the workspace app 70. The workspace app 70 is how a user gets access to their workspace resources, one category of which is applications. These applications can be SaaS apps, web apps or virtual apps. The workspace app 70 also gives users access to their desktops, which may be a local desktop or a virtual desktop. Further, the workspace app 70 gives users access to their files and data, which may be stored in numerous repositories. The files and data may be hosted on Citrix ShareFile, hosted on an on-premises network file server, or hosted in some other cloud storage provider, such as Microsoft OneDrive or Google Drive Box, for example.

To provide a unified experience, all of the resources a user requires may be located and accessible from the workspace app 70. The workspace app 70 is provided in different versions. One version of the workspace app 70 is an installed application for desktops 72, which may be based on Windows, Mac or Linux platforms. A second version of the workspace app 70 is an installed application for mobile devices 74, which may be based on iOS or Android platforms. A third version of the workspace app 70 uses a hypertext markup language (HTML) browser to provide a user access to their workspace environment. The web version of the workspace app 70 is used when a user does not want to install the workspace app or does not have the rights to install the workspace app, such as when operating a public kiosk 76.

Each of these different versions of the workspace app 70 may advantageously provide the same user experience. This advantageously allows a user to move from client device 72 to client device 74 to client device 76 in different platforms and still receive the same user experience for their workspace. The client devices 72, 74 and 76 are referred to as endpoints.

As noted above, the workspace app 70 supports Windows, Mac, Linux, iOS, and Android platforms as well as platforms with an HTML browser (HTML5). The workspace app 70 incorporates multiple engines 80-90 allowing users access to numerous types of app and data resources. Each engine 80-90 optimizes the user experience for a particular resource. Each engine 80-90 also provides an organization or enterprise with insights into user activities and potential security threats.

An embedded browser engine 80 keeps SaaS and web apps contained within the workspace app 70 instead of launching them on a locally installed and unmanaged browser. With the embedded browser, the workspace app 70 is able to intercept user-selected hyperlinks in SaaS and web apps and request a risk analysis before approving, denying, or isolating access.

A high definition experience (HDX) engine 82 establishes connections to virtual browsers, virtual apps and desktop sessions running on either Windows or Linux operating systems. With the HDX engine 82, Windows and Linux resources run remotely, while the display remains local, on the endpoint. To provide the best possible user experience, the HDX engine 82 utilizes different virtual channels to adapt to changing network conditions and application requirements. To overcome high-latency or high-packet loss networks, the HDX engine 82 automatically implements optimized transport protocols and greater compression algorithms. Each algorithm is optimized for a certain type of display, such as video, images, or text. The HDX engine 82 identifies these types of resources in an application and applies the most appropriate algorithm to that section of the screen.

For many users, a workspace centers on data. A content collaboration engine 84 allows users to integrate all data into the workspace, whether that data lives on-premises or in the cloud. The content collaboration engine 84 allows administrators and users to create a set of connectors to corporate and user-specific data storage locations. This can include OneDrive, Dropbox, and on-premises network file shares, for example. Users can maintain files in multiple repositories and allow the workspace app 70 to consolidate them into a single, personalized library.

A networking engine 86 identifies whether or not an endpoint or an app on the endpoint requires network connectivity to a secured backend resource. The networking engine 86 can automatically establish a full VPN tunnel for the entire endpoint device, or it can create an app-specific i-VPN connection. A p-VPN defines what backend resources an application and an endpoint device can access, thus protecting the backend infrastructure. In many instances, certain user activities benefit from unique network-based optimizations. If the user requests a file copy, the workspace app 70 can automatically utilize multiple network connections simultaneously to complete the activity faster. If the user initiates a VoIP call, the workspace app 70 improves its quality by duplicating the call across multiple network connections. The networking engine 86 uses only the packets that arrive first.

An analytics engine 88 reports on the user's device, location and behavior, where cloud-based services identify any potential anomalies that might be the result of a stolen device, a hacked identity or a user who is preparing to leave the company. The information gathered by the analytics engine 88 protects company assets by automatically implementing counter-measures.

A management engine 90 keeps the workspace app 70 current. This not only provides users with the latest capabilities, but also includes extra security enhancements. The workspace app 70 includes an auto-update service that routinely checks and automatically deploys updates based on customizable policies.

Figure 5:
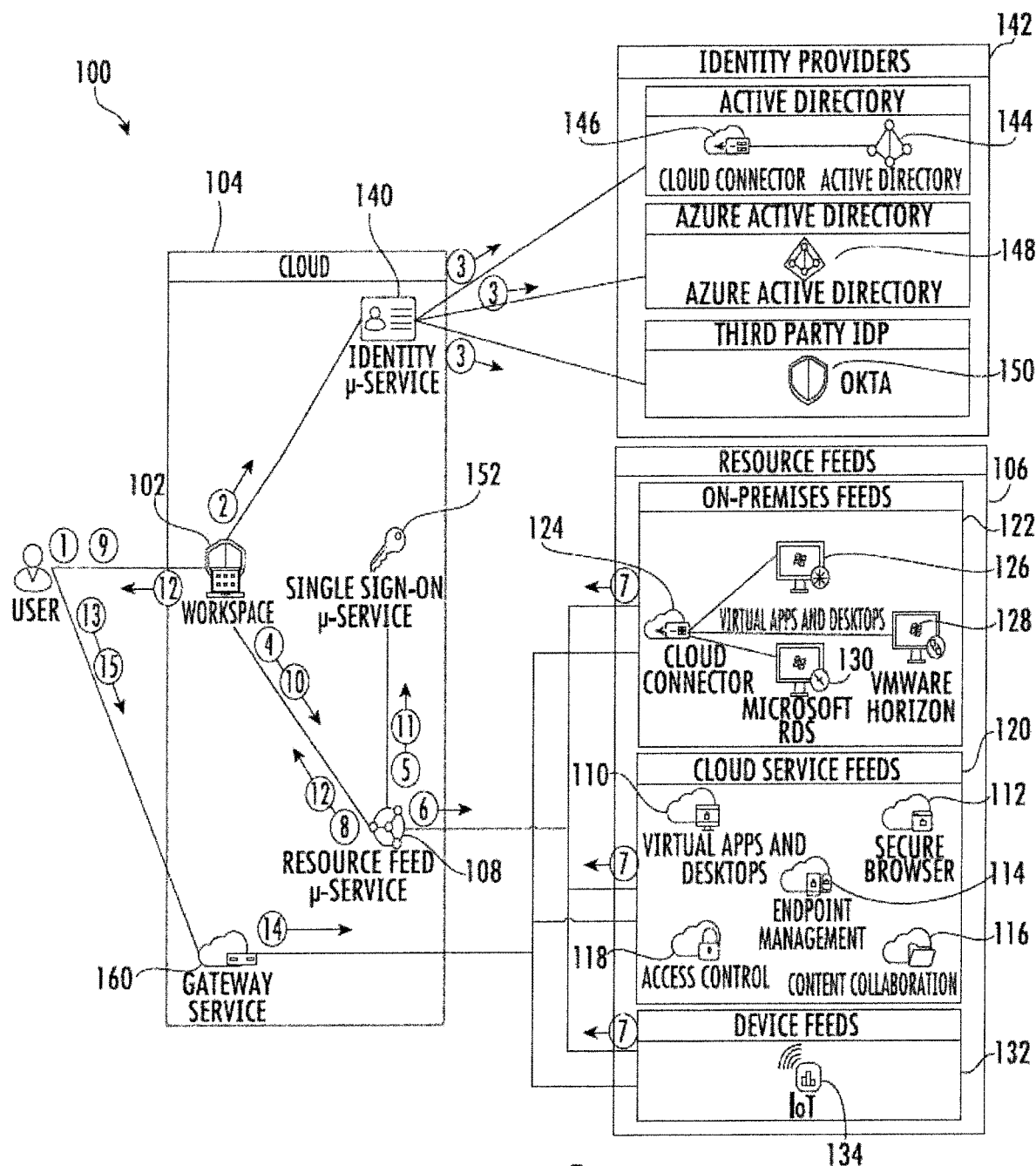
FIG. 5 is a schematic block diagram of a workspace network environment of computing devices in which various aspects of the disclosure may be implemented.

Referring now to FIG. 5, a workspace network environment 100 providing a unified experience to a user based on the workspace app 70 will be discussed. The desktop, mobile and web versions of the workspace app 70 all communicate with the workspace experience service 102 running within the Citrix Cloud 104. The workspace experience service 102 then pulls in all the different resource feeds 16 via a resource feed micro-service 108. That is, all the different resources from other services running in the Citrix Cloud 104 are pulled in by the resource feed micro-service 108. The different services may include a virtual apps and desktop service 110, a secure browser service 112, an endpoint management service 114, a content collaboration service 116, and an access control service 118. Any service that an organization or enterprise subscribes to are automatically pulled into the workspace experience service 102 and delivered to the user's workspace app 70.

In addition to cloud feeds 120, the resource feed micro-service 108 can pull in on-premises feeds 122. A cloud connector 124 is used to provide virtual apps and desktop deployments that are running in an on-premises data center. Desktop virtualization may be provided by Citrix virtual apps and desktops 126, Microsoft RDS 128 or VMware Horizon 130, for example. In addition to cloud feeds 120 and on-premises feeds 122, device feeds 132 from Internet of Thing (IoT) devices 134, for example, may be pulled in by the resource feed micro-service 108. Site aggregation is used to tie the different resources into the user's overall workspace experience.

The cloud feeds 120, on-premises feeds 122 and device feeds 132 each provides the user's workspace experience with a different and unique type of application. The workspace experience can support local apps, SaaS apps, virtual apps, and desktops browser apps, as well as storage apps. As the feeds continue to increase and expand, the workspace experience is able to include additional resources in the user's overall workspace. This means a user will be able to get to every single application that they need access to.

Still referring to the workspace network environment 20, a series of events will be described on how a unified experience is provided to a user. The unified experience starts with the user using the workspace app 70 to connect to the workspace experience service 102 running within the Citrix Cloud 104, and presenting their identity (event 1). The identity includes a user name and password, for example.

The workspace experience service 102 forwards the user's identity to an identity micro-service 140 within the Citrix Cloud 104 (event 2). The identity micro-service 140 authenticates the user to the correct identity provider 142 (event 3) based on the organization's workspace configuration. Authentication may be based on an on-premises active directory 144 that requires the deployment of a cloud connector 146. Authentication may also be based on Azure Active Directory 148 or even a third party identity provider 150, such as Citrix ADC or Okta, for example.

Once authorized, the workspace experience service 102 requests a list of authorized resources (event 4) from the resource feed micro-service 108. For each configured resource feed 106, the resource feed micro-service 108 requests an identity token (event 5) from the single-sign micro-service 152.

The resource feed specific identity token is passed to each resource's point of authentication (event 6). On-premises resources 122 are contacted through the Citrix Cloud Connector 124. Each resource feed 106 replies with a list of resources authorized for the respective identity (event 7).

The resource feed micro-service 108 aggregates all items from the different resource feeds 106 and forwards (event 8) to the workspace experience service 102. The user selects a resource from the workspace experience service 102 (event 9).

The workspace experience service 102 forwards the request to the resource feed micro-service 108 (event 10). The resource feed micro-service 108 requests an identity token from the single sign-on micro-service 152 (event 11). The user's identity token is sent to the workspace experience service 102 (event 12) where a launch ticket is generated and sent to the user.

The user initiates a secure session to a gateway service 160 and presents the launch ticket (event 13). The gateway service 160 initiates a secure session to the appropriate resource feed 106 and presents the identity token to seamlessly authenticate the user (event 14). Once the session initializes, the user is able to utilize the resource (event 15). Having an entire workspace delivered through a single access point or application advantageously improves productivity and streamlines common workflows for the user.

Figure 6:
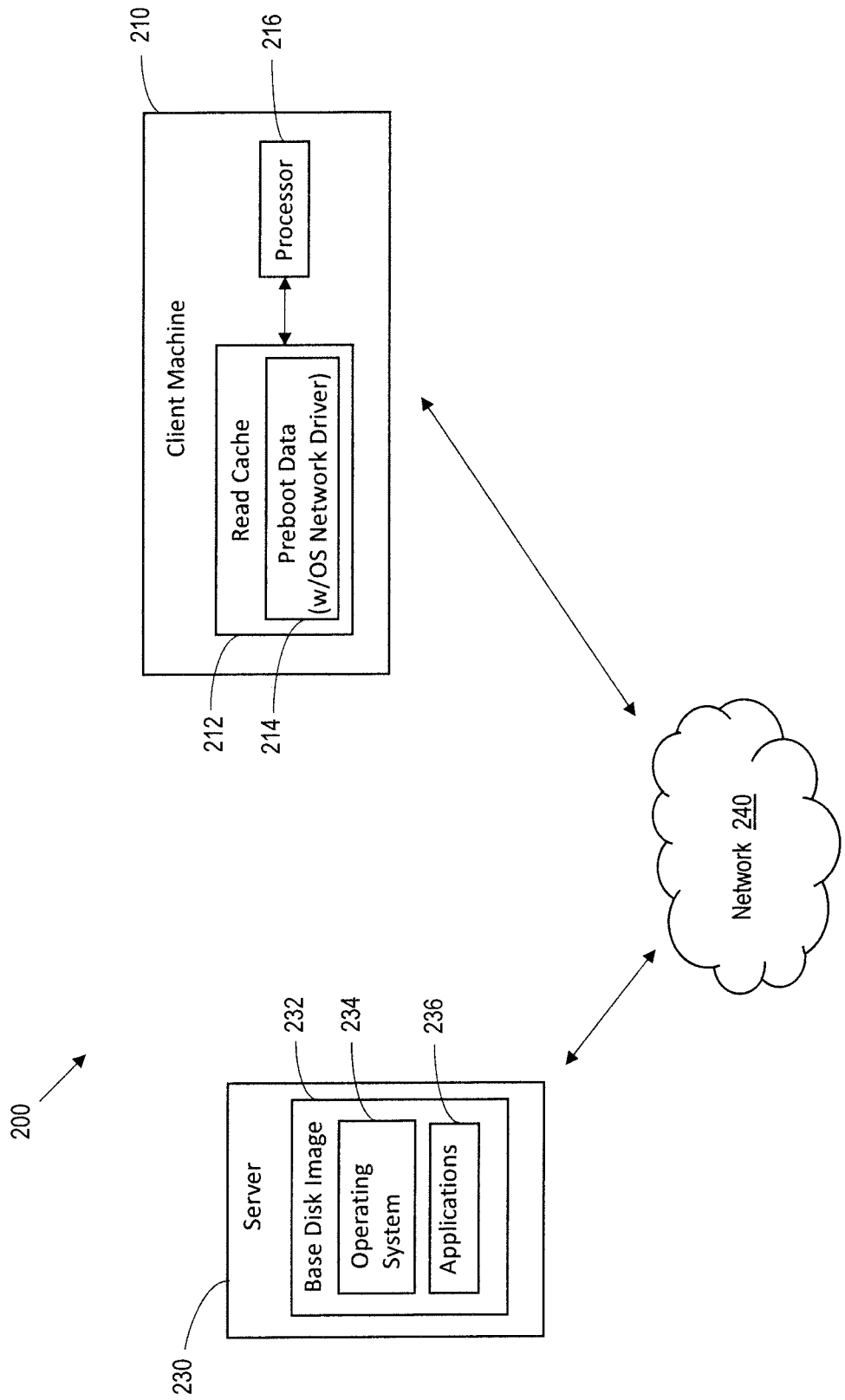
FIG. 6 is a schematic block diagram of a computing system with a client machine including a read cache in which various aspects of the disclosure may be implemented.

Referring now to FIG. 6, a computing system 200 provides the ability for a client machine 210 to receive a base disk image 232 that is streamed from a server 230 when firmware in the client machine 210 does not provide a network driver during preboot. The firmware is used to perform hardware initialization during the preboot process. The preboot process is part of a preboot execution environment (PXE) that allows the client machine 210 that is not yet loaded with an operating system to be configured and prebooted. As will be discussed in detail below, the client machine 210 includes memory with a read cache 212 that includes preboot data 214. The preboot data 214 is accessed by the firmware and includes the network driver to be used to connect to a communications network 240 to receive the streamed base disk image 232.

The illustrated computing system 200 includes the server 230 configured to stream the base disk image 232 over the communications network 240. The client machine 210 includes the read cache 212 configured to store preboot data 214 including the network driver. A processor 216 is coupled to the read cache 212. The processor 216 is configured to initiate prebooting of the client machine 210 using the preboot data 214. After the network driver is running, the processor 216 is able to receive the streamed base disk image 232 from the server 230 via the communications network 240.

As noted above, the base disk image 232 includes an operating system 234 and applications 236. The operating system 234 includes an operating system network driver. The network driver in the preboot data 214 is the same as the operating system network driver. The operating system 234 may be Microsoft Windows from Microsoft Corp., for example. The firmware in the client machine 210 is preinstalled to perform hardware initialization during the preboot process, and is the first software to run when the client machine 210 is powered on.

The firmware may be UEFI (Unified Extensible Firmware Interface) firmware, for example. As readily appreciated by those skilled in the art, UEFI firmware is intended to replace BIOS (Basic Input/Output System) firmware.

When a client machine is intended to operate using a base disk image stored on a local disk within the client machine, a network driver is not needed in its firmware. This is because the client machine is to boot from the base disk image stored on the local disk. Consequently, the manufacturer of the client machine 210 has removed the network driver from the firmware because it is not needed to boot the client machine 210.

In order for cloud service providers, such as Azure and Google Cloud Platform, to change from using a base disk image stored on a local disk within the client machine 210 to using a base disk image 232 streamed from the server 230, the processor 216 within the client machine 210 needs access to the communications network 240 during preboot. If the communications network 240 cannot be accessed by the client machine 210, then the client machine 210 cannot become operational. The read cache 212 includes a subset of the operating system 234 including the operating system network driver. The read cache 212 allows the client machine 210 to preboot without communicating with the server 230 via the communications network 240. The read cache 212 advantageously bridges the gap during firmware preboot when there is no network driver.

The processor 216 within the client machine 210 is configured to access the reach cache 212 for the preboot data 214 included therein. More particularly, the processor 216 executes the operating system loader within the client machine 210. The processor 216 retrieves required parameters by a local configuration file during preboot without needing to connect to the server 230 via the communications network 240. The local configuration file is used to configure initial settings for the client machine 210. The required parameters contain data to transition to the operating system loader.

After the network driver in the read cache 212 has been loaded and starts to run, communications with the server 230 via the communications network 240 is initiated. The processor 216 switches from using the preboot data 214 in the read cache 212 to using data in the streamed base disk image 232 in response to the network driver running. Communications with the server 230 allows the client machine 210 to receive the rest of the base disk image 232 via the communications network 240 (e.g., via streaming).

The firmware is in search for data to boot up the operating system for the client machine 210. Since the preboot data 214 in the read cache 212 supports a limited portion of the operating system, the processor 216 is instructed to use the network driver in the read cache 212 to continue loading the remaining portion of the operating system 234 needed by the client machine 210. As soon as the network driver is running, the client machine 210 transitions from a preboot environment to an environment where data in the streamed base disk image 232 is being received.

In one embodiment, the preboot data 214 in the read cache 212 is the same as the operating system in the base disk image 232 that is to be streamed by the server 230. This approach insures that the preboot data 214 contains the necessary disk blocks for the operating system loader, kernal and boot-time drivers to start. The kernel is at the core of the operating system and facilitates interactions between hardware and software components.

A tradeoff of the preboot data 214 being the same as the operating system in the base disk image 232 is that the size of the read cache 212 is larger than what is actually needed to preboot the client machine 210. In this approach, a size of the read cache 212 may be about 10 GB, for example.

To reduce the size of the read cache 212, the preboot data 214 in the read cache 212 may be a subset of the operating system. This approach may be based on a determination of what files will be loaded by the operating system loader in the preboot environment. For example, a starting minimum list of files used in the boot process is generated, and files that are needed in the preboot process are selectively added. Since the base disk image 232 varies between different cloud service providers, the determination can be an iterative process to identify which files are needed in the read cache 212 to preboot the client machine 210.

Figure 7:
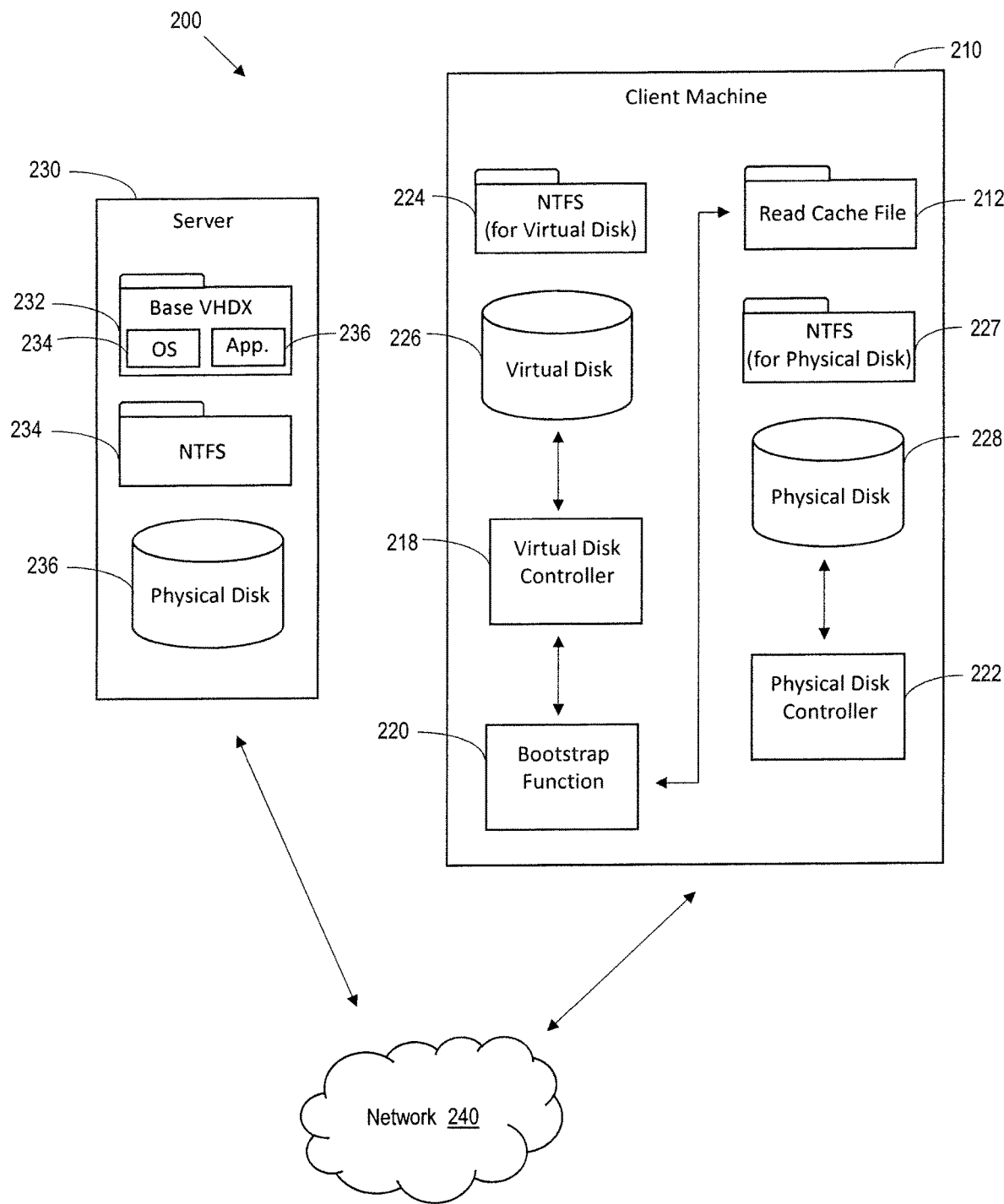
FIG. 7 is a more detailed schematic block diagram of the computing system illustrated in FIG. 6.

Referring now to FIG. 7, the computing system 200 will be discussed in greater detail. The server 230 includes a base disk image 232 for servicing any number of provisioned machines, virtual or physical, of any number of client machines 210 on the communications network 240. The base disk image 232 may also be referred to as a base virtual hard disk (VHDX). The base disk image 232 includes an operating system 234 and applications 236 used by the provisioned virtual machines of the client machine 102. The base disk image 232 may execute on the NTFS (New Technology File System) file system 234 of the physical disk 236 within the server 230. The NTFS file system is the file system that the Windows operating system uses for storing and retrieving files on disk partitions in the physical disk 236.

More particularly, the base disk image 232 includes a functionality of any software, hardware or a combination of software and hardware, programs, executables, functions, instructions, data or libraries. The base disk image 232 may include files, programs, instructions, applications or procedures needed or used to operate any application or service. The base disk image 232 may include any functionality to enable the operation of a provisioned machine executing on the client machine 210.

The NTFS is a file system that an operating system uses for storing and retrieving files on a virtual or physical disk. The NTFS may be a hierarchical or a non-hierarchical file system, and may be configured to operate on any operating system referenced herein. The NTFS may be or include the functionality of a file allocation table (FAT) filing system.

The client machine 210 includes a physical disk 228 that stores a read cache file 212, which resides on the NTFS file system 227 of the physical disk 228. The NTFS file system 227 may present a mount point D drive for the physical disk 228. A mount point is a drive that represents the data on the physical disk 228 managed by the NTFS file system. The client machine 210 further includes a virtual disk 226. The NTFS file system 224 may present a mount point C drive for the virtual disk 226. The C drive provides the environment for the processor 216 within the client machine 210 to execute the operating system 234, applications 236 and services that are to be provided by the base disk image 232 streamed from the server 230.

A bootstrap function 220 is for controlling or managing the pre-booting and booting process for starting up the client machine 210. The bootstrap function 220 is software based and may include a program, such as a UEFI application.

A virtual disk controller 218 is for controlling or managing the virtual disk 226 of the client machine 210. The virtual disk controller 218 may include any software, hardware or a combination of software and hardware, programs, functions, executables, instructions, data or libraries. The virtual disk controller 218 may start up the virtual disk 226 responsive to an instruction from the bootstrap function 220 during the start up or preboot of the client machine 210.

Similarly, a physical disk controller 222 is for controlling or managing the physical disk 228 of the client machine 210. The physical disk controller 222 may start up the physical disk 228 during the start up or preboot of the client machine 210.

During preboot, the firmware within the client machine 210 boots up from a designated firmware loader located on the physical disk 228. This is performed via the physical disk controller 222. The firmware loader is on a FAT (File Allocation Table) partition within the physical disk 228. The firmware loader may be an EFI (Extensible Firmware Interface) file, which includes boot loader executables that contain data on how the boot process is to proceed. EFI files are associated with UEFI firmware.

The firmware loader operates in a networkless preboot environment. A networkless preboot environment means that the client machine 210 cannot connect to the communications network 240 during preboot. The firmware loader retrieves required parameters using a local configuration file, and the local configuration file may be an INI file. An INI file is a file extension for an initialization file format that is used by the processor 216. The firmware does not need to communicate with the server 230 during early preboot since the preboot data 214 is available in the read cache 212.

At this point, the firmware loader is looking to read blocks from the C drive on the virtual disk 226 for the operating system loader. However, the firmware loader via the virtual disk controller 218 and the bootstrap function 220 embeds a NTFS file system driver to find the read cache file 212 located on the physical disk 228. The read cache file 212 is deployed during creation of the client machine 210, and is a subset of the operating system on the base disk image 232.

The read cache file 212, in some examples, can be a virtual hard disk (VHDX) file. Once the read cache file 212 is found, the firmware loader mounts it as a virtual disk. The virtual disk may be a Microsoft Hyper-V virtual hard disk, for example. A virtual disk 226 is then presented to the firmware as a newly added disk. The firmware loader starts to load the operating system loaders from the virtual disk 226. As the operating system 234 boots, the operating system 234 will present the mount point C drive.

During this preboot process, an operating system kernel is loaded including the network driver from the read cache 212. Control is then passed to the operating system kernel which picks a network interface controller (NIC) to use to connect the network driver to the communications network 240. At this point, the operating system 234 transitions to using the network driver to stream data from the base disk image 232 instead of using the preboot data in the read cache 212.

Figure 8:
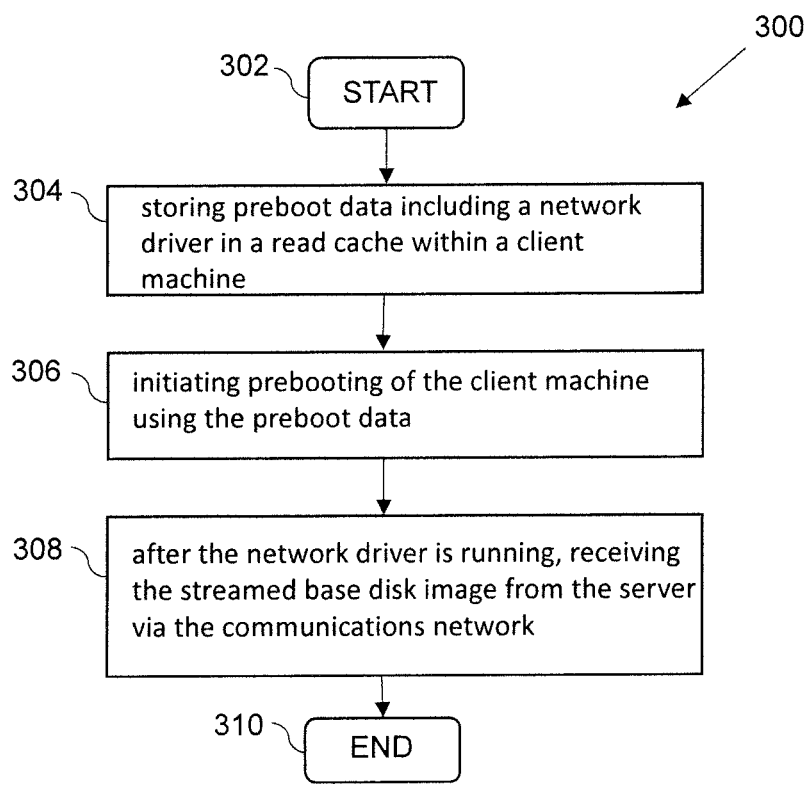
FIG. 8 is a flowchart of a method for operating the client machine illustrated in FIG. 6.

Referring now to FIG. 8, a general flowchart 300 illustrating a method for operating the client machine 210 will be discussed. From the start (Block 302), the method includes storing preboot data 214 including a network driver in a read cache 212 within the client machine 210 at Block 304. The method further includes operating a processor 216 coupled to the read cache 212 to initiate prebooting of the client machine 210 using the preboot data 214 at Block 306. After the network driver is running, a streamed base disk image is received from a server 230 via a communications network 240, at Block 308. The method ends at Block 310.

Figure 9:
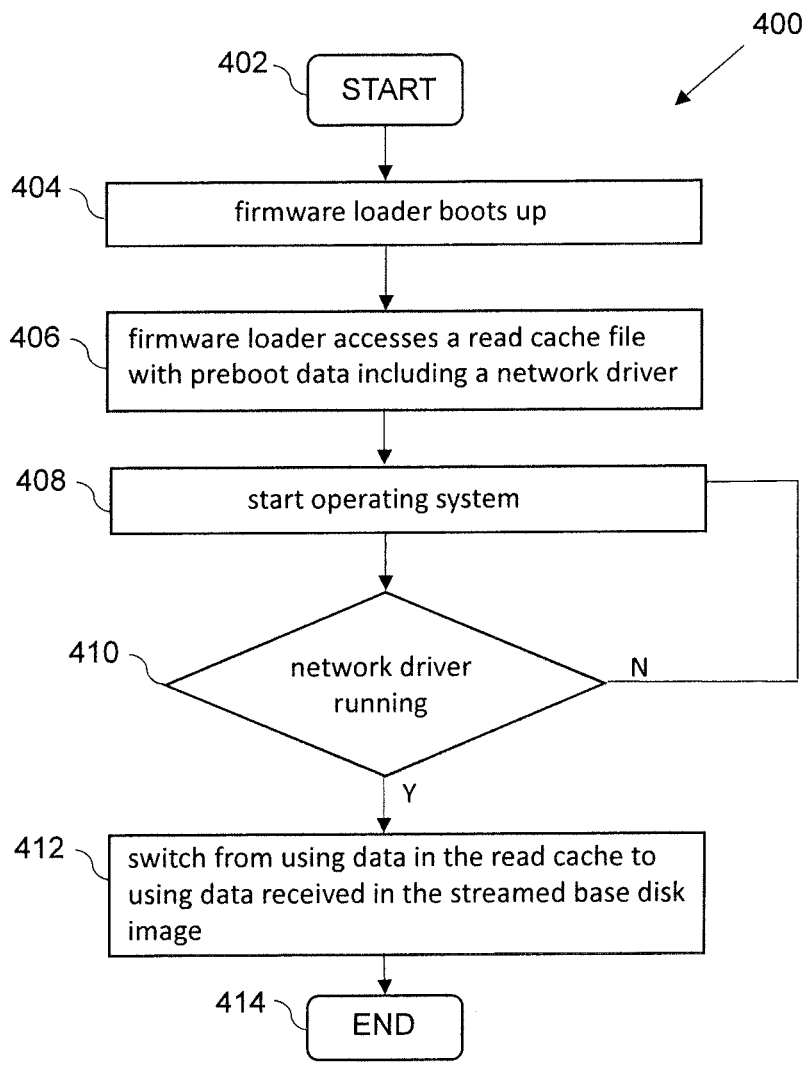
FIG. 9 is a more detailed flowchart of a method for operating the client machine illustrated in FIG. 6.

Referring now to FIG. 9, a more detailed flowchart 400 illustrating a method for operating the client machine 210 will be discussed. From the start (Block 402), the method includes booting up the firmware loader at Block 404. The firmware loader is used to perform hardware initialization during the preboot process. The firmware loader accesses a read cache 212 with preboot data including a network driver at Block 406.

Since the read cache 212 is a subset of the operating system 234, the operating system 234 starts to run at Block 408. A determination is made at Block 410 about if the network driver is running. If the network driver is not running, then the method loops back to Block 408 until the network driver is running. If the network driver is not running, the client machine 210 cannot connect to the communications network 240.

When the determination is made that the network driver is running, then the processor 216 within the client machine 210 switches at Block 412 from using the preboot data in the read cache 212 to using data received in the streamed base disk image 232. The client machine 210 continues the boot process via the data in the received streamed base disk image 232. The method ends at Block 414.

The following examples are further example embodiments, from which other permutations and configurations will be apparent to the skilled artisan.

Example 1 is a computing system comprising a server configured to stream a base disk image over a communications network, and a client machine. The client machine comprises a read cache configured to store preboot data including a network driver, and a processor coupled to the read cache. The processor is configured to initiate prebooting of the client machine using the preboot data, and after the network driver is running, receive the streamed base disk image from the server via the communications network to continue booting the client machine.

Example 2 includes the subject matter of Example 1, wherein the base disk image includes an operating system, and wherein the preboot data further includes a subset of the operating system including the network driver.

Example 3 includes the subject matter of any of Examples 1-2, wherein the operating system includes an operating system network driver, and wherein the network driver is configured to be the same as the operating system network driver.

Example 4 includes the subject matter of any of Examples 1-3, wherein the processor is further configured to switch from using preboot data in the read cache to using data in the streamed base disk image to continue booting the client machine in response to the network driver running.

Example 5 includes the subject matter of any of Examples 1-4, wherein the processor is further configured to execute instructions at preboot to access the read cache for the preboot data.

Example 6 includes the subject matter of any of Examples 1-5, wherein the client machine further comprises firmware to provide the instructions to be executed at preboot, and wherein the firmware comprises UEFI (Unified Extensible Firmware Interface) firmware.

Example 7 includes the subject matter of any of Examples 1-6, wherein the preboot data includes an operating system kernel that includes the network driver, and as the operating system kernel starts to run, the network driver connects to the communications network.

Example 8 is a client machine comprising a read cache configured to store preboot data including a network driver, and a processor coupled to the read cache. The processor is configured to initiate prebooting of the client machine using the preboot data, and after the network driver is running, receive a streamed base disk image from a server via a communications network to continue booting the client machine.

Example 9 includes the subject matter of Example 8, wherein the base disk image includes an operating system, and wherein the preboot data further includes a subset of the operating system including the network driver.

Example 10 includes the subject matter of any of Examples 8-9, wherein the operating system includes an operating system network driver, and wherein the network driver is configured to be the same as the operating system network driver Example 11 includes the subject matter of any of Examples 8-10, wherein the processor is further configured to switch from using the preboot data in the read cache to using data in the streamed base disk image to continue booting the client machine in response to the network driver running.

Example 12 includes the subject matter of any of Examples 8-11, wherein the processor is further configured to execute instructions at preboot to access the read cache for the preboot data.

Example 13 includes the subject matter of any of Examples 8-12, with the client machine further comprising firmware to provide the instructions to be executed at preboot, and wherein the firmware comprises UEFI (Unified Extensible Firmware Interface) firmware.

Example 14 includes the subject matter of any of Examples 8-13, wherein the preboot data includes an operating system kernel that includes the network driver, and as the operating system kernel starts to run, the network driver connects to the communications network.

Example 15 is a method comprising storing, by a client machine, preboot data including a network driver in a read cache within the client machine, and initiating, by the client machine, prebooting of the client machine using the preboot data. After the network driver is running, receiving, by the client machine, a streamed base disk image from a server via a communications network to continue booting the client machine.

Example 16 includes the subject matter of Example 15, wherein the base disk image includes an operating system, and wherein the preboot data further includes a subset of the operating system including the network driver.

Example 17 includes the subject matter of any of Examples 15-16, wherein the operating system includes an operating system network driver, and wherein the network driver is configured to be the same as the operating system network driver.

Example 18 includes the subject matter of any of Examples 15-17, wherein the client machine is further operated to switch from using the preboot data in the read cache to using data in the streamed base disk image in response to the network driver running.

Example 19 includes the subject matter of any of Examples 15-18, further comprising executing, by the client machine, instructions at preboot to access the read cache for the preboot data.

Example 20 includes the subject matter of any of Examples 15-19, wherein the preboot data includes an operating system kernel that includes the network driver, and as the operating system kernel starts to run, the network driver connects to the communications network.

As will be appreciated by one of skill in the art upon reading the above disclosure, various aspects described herein may be embodied as a device, a method or a computer program product (e.g., a non-transitory computer-readable medium having computer executable instruction for performing the noted operations or steps). Accordingly, those aspects may take the form of an entirely hardware embodiment, an entirely software embodiment, or an embodiment combining software and hardware aspects.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof.

Many modifications and other embodiments will come to the mind of one skilled in the art having the benefit of the teachings presented in the foregoing descriptions and the associated drawings. Therefore, it is understood that the foregoing is not to be limited to the example embodiments, and that modifications and other embodiments are intended to be included within the scope of the appended claims.

That which is claimed is:

1. A computing system comprising:
a server configured to stream a base disk image over a communications network; and
a client machine comprising:
a read cache file configured to store preboot data including a network driver, and
a processor configured to perform the following:
execute the read cache file to initiate prebooting of the client machine using the preboot data to run the network driver to connect the client machine to the communications network, and
after the network driver is running, receive the streamed base disk image from said server via the communications network to boot the client machine.

2. The computing system according to claim 1 wherein the base disk image includes an operating system, and wherein the preboot data further includes a subset of the operating system including the network driver.

3. The computing system according to claim 2 wherein the operating system includes an operating system network driver, and wherein the network driver is configured to be the same as the operating system network driver.

4. The computing system according to claim 1 wherein said processor is further configured to switch from using the preboot data in the read cache to using data in the streamed base disk image in response to the network driver running.

5. The computing system according to claim 1 wherein said processor is further configured to execute instructions at preboot to access said read cache for the preboot data.

6. The computing system according to claim 5 wherein said client machine further comprises firmware to provide the instructions to be executed at preboot, and wherein the firmware comprises UEFI (Unified Extensible Firmware Interface) firmware.

7. The computing system according to claim 1 wherein the preboot data includes an operating system kernel that includes the network driver, and as the operating system kernel starts to run, the network driver connects to the communications network.

8. A client machine comprising:
   a read cache file configured to store preboot data including a network driver; and
   a processor configured to perform the following:
      execute the read cache file to initiate prebooting of the client machine using the preboot data to run the network driver to connect the client machine to the communications network, and
      after the network driver is running, receive a streamed base disk image from a server via a communications network to boot the client machine.

9. The client machine according to claim 8 wherein the base disk image includes an operating system, and wherein the preboot data further includes a subset of the operating system including the network driver.

10. The client machine according to claim 9 wherein the operating system includes an operating system network driver, and wherein the network driver is configured to be the same as the operating system network driver.

11. The client machine according to claim 8 wherein said processor is further configured to switch from using the preboot data in the read cache to using data in the streamed base disk image in response to the network driver running.

12. The client machine according to claim 8 wherein said processor is further configured to execute instructions at preboot to access said read cache for the preboot data.

13. The client machine according to claim 12 further comprising firmware to provide the instructions to be executed at preboot, and wherein the firmware comprises UEFI (Unified Extensible Firmware Interface) firmware.

14. The client machine according to claim 8 wherein the preboot data includes an operating system kernel that includes the network driver, and as the operating system kernel starts to run, the network driver connects to the communications network.

15. A method comprising:
   storing, by a client machine, preboot data including a network driver in a read cache file within the client machine;
   executing, by the client machine, the read cache file to initiate prebooting of the client machine using the preboot data to run the network driver to connect the client machine to the communications network; and
   after the network driver is running, receiving, by the client machine, a streamed base disk image from a server via a communications network to boot the client machine.

16. The method according to claim 15 wherein the base disk image includes an operating system, and wherein the preboot data further includes a subset of the operating system including the network driver.

17. The method according to claim 16 wherein the operating system includes an operating system network driver, and wherein the network driver is configured to be the same as the operating system network driver.

18. The method according to claim 15 wherein the client machine is further operated to switch from using the preboot data in the read cache to using data in the streamed base disk image in response to the network driver running.

19. The method according to claim 15 further comprising executing, by the client machine, instructions at preboot to access the read cache for the preboot data.

20. The method according to claim 15 wherein the preboot data includes an operating system kernel that includes the network driver, and as the operating system kernel starts to run, the network driver connects to the communications network.

* * * * *